United States Patent Office 3,383,242
Patented May 14, 1968

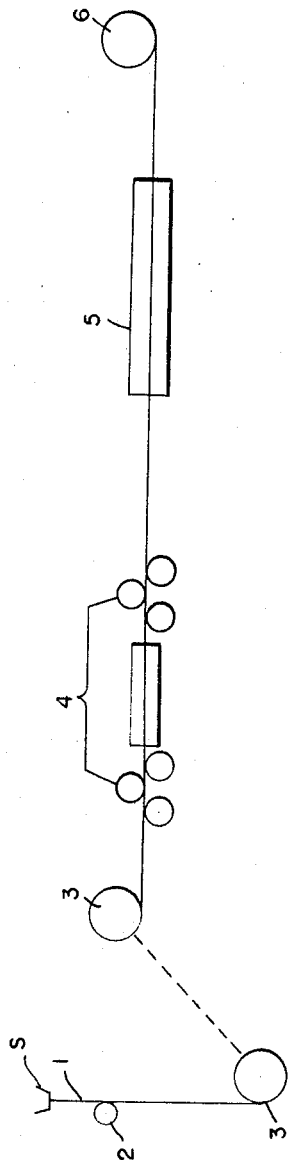
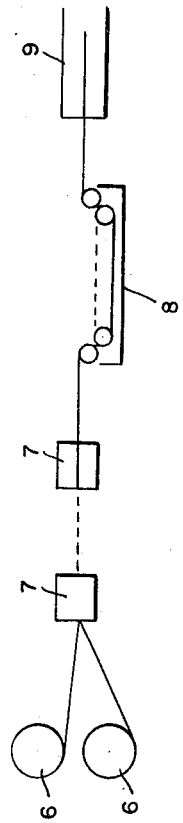

3,383,242
PRETREATMENT OF POLYETHYLENE TEREPH-
THALATE FILAMENTS FOR SUBSEQUENT
RUBBER ADHESION
Karl Macura, Klingenberg (Main), Erhard Siggel, Laud-
enbach (Main), and Franz-Josef Schmitz, Erlenbach
(Main), Germany, assignors to Glanzstoff AG, Wupper-
tal, Germany
Continuation-in-part of application Ser. No. 338,719,
Jan. 20, 1964. This application Nov. 17, 1966, Ser.
No. 595,246
Claims priority, application Germany, Jan. 22, 1963,
V 23,541
10 Claims. (Cl. 117—138.8)

ABSTRACT OF THE DISCLOSURE

The present invention is concerned with an improve-
ment in the method of applying a bonding composition
of the diglycidic ether of an aliphatic diol and an amine
curing agent to polyethylene terephthalate filaments, this
bonding composition acting as a base coating when cured
or heat-fixed onto the filaments and being capable of re-
ceiving a subsequent coating of a synthetic or natural
rubber composition, especially a known resorcinol-form-
aldehyde-latex composition, in order to obtain better
properties of rubber adhesion. In particular, this inven-
tion is directed to a combined or substantially concur-
rent application of both the base coating and a textile
lubricating agent to the non-woven polyethylene tereph-
thalate filaments.

This application is a continuation-in-part of our co-
pending application, Ser. No. 338,719, filed Jan. 20, 1964,
and now abandoned.

According to the copending application of Karl
Macura and Franz-Josef Schmitz, Ser. 338,626, and now
abandoned, filed Jan. 20, 1964, a process is disclosed for
the improvement of the rubber adhesion of polyethylene
terephthalate as tire cord or a similar reinforcing struc-
ture by treating the individual filaments, the cord yarn
or cord fabric in a two-stage process. As the bonding
agents, there are used in the first stage or pretreatment
step an aqueous solution or dispersion of the diglycidic
ether of an aliphatic diol and an amine curing agent or
catalyst, e.g. various heterocyclic or aliphatic amines,
while in the second stage there is used a known combina-
tion of a resorcinol-formaldehyde precondensate and a
vinyl pyridine latex. A similar two-stage process is de-
scribed in U.S. Patent No. 2,902,398.

The object of the present invention is to provide a
method of applying the bonding composition to the poly-
ethylene terephthalate filaments at a point in the overall
two-stage process which will essentially eliminate one
process step while still achieving a satisfactory lubrica-
tion of the filaments, thread or yarn throughout their
mechanical transport and handling. Thus, it is particular-
ly desired to provide an overall process in accordance
with the present invention whereby the filaments will run
smoothly and with a minimum of friction throughout
various spooling, winding, transporting, twisting, cording,
weaving or similar mechanical textile operations while
still taking advantage of the improved bonding agents
and composite bonding layers which lead to better rub-
ber adhesion.

The overall process combining the essential features
of this invention are shown in the accompanying draw-
ing wherein FIGS. 1 and 2 are schematic representations
of the first and second stages of the process, respectively.

It has now been found, in accordance with the present
invention, that an especially advantageous overall two-
stage process can be achieved with the bonding composi-
tion containing the diglycidic ether of an aliphatic diol
and an amine curing agent if these components are ap-
plied to the polyethylene terephthalate filaments as a
non-corded or non-woven yarn substantially concurrently
with the application of a spinning preparation containing
a lubricating agent which is adapted to lubricate the
yarn during subsequent transport and handling of said
yarn from the first stage to the second stage. It is espe-
cially desirable to apply this initial bonding composition
and the lubricating agent immediately after the fila-
ments have been spun from the molten polyester and
before stretching for fiber orientation. Thereafter, the
yarn containing the precoated bonding composition and
lubricating agent is heated, e.g., with hot air or steam,
to an elevated temperature, preferably between about
160° C. and 255° C., in one or more steps which are
normally required for stretching and/or heat-setting the
filaments but are also sufficient to heat-fix or cure the
ether and amine components onto the filaments. The
filaments are then made into a cord yarn and corded or
otherwise formed into a rubber reinforcing structure
such as a tire cord, and the resorcinol-formaldehyde-latex
bonding agent is applied and heat-fixed thereon in a con-
ventional manner.

The base coating composition of the first stage is
essential the curable combination of the diglycidic ether
of an aliphatic diol and an amine as the curing agent.
Suitable diglycidic ethers are those derived from aliphatic
dihydric alcohols, for example by reaction of epichloro-
hydrin with aliphatic diols wherein the aliphatic chain
may be branched or unbranched, saturated or unsatu-
rated, and which in itself may contain ether linkages.
Also, while the diol employed in forming the diglycidic
ether contains only two hydroxy groups, it may be fur-
ther substituted by other nonionogenic and substantially
inert substituents such as alkoxy or halogen, e.g., chlo-
rine or bromine. These ethers represent a well-known
class of compounds which are generally useful in bond-
ing compositions. For purposes of the present invention,
the ether component is preferably the diglycidic ether
of an alkanediol, especially compounds of the formula

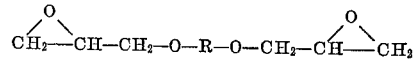

wherein R is a lower alkylene radical of up to 10 carbon
atoms, e.g., the diglycidic ethers of butanediols, propane-
diols and ethylene glycol with the structural formula

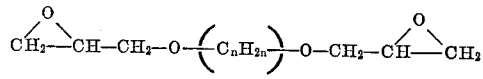

wherein $n$ is an integer of 2 to 4. The diglycidic ether
component should generally be applied to the filaments
in an amount of about 0.1 to 2% by weight from an
aqueous medium which may contain from 3 to 50% by
weight of the diglycidic ether with reference to the total
water present.

The amine component of this bonding composition is
a conventional hardening catalyst or curing agent, pref-
erably an aliphatic or heterocyclic amine having only
carbon, hydrogen and nitrogen atoms, the nitrogen atoms
being connected to a hydrocarbon structure of up to about
12 carbon atoms, preferably 2 to 10 carbon atoms, and
still more preferably 3 to 6 carbon atoms. Suitable amines
include, for example: alkylamines, alkylene polyamines,
polyalkylene polyamines, polyalkylene imines and polyi-
mines, guanidine and its derivatives such as N-lower alkyl
guanidine and dicyandiamide, and more particularly such
compounds as piperazine, piperidine, pyridine, hexamethylene diamine and di-isopropylamine. The amine is most advantageously employed in an amount of about 1 to 100%, preferably 5 to 15%, by weight with reference to the diglycidic ether.

Bonding compositions in admixture with water are most easily prepared by using water-soluble diglycidic ethers and amines, but where an emulsifying agent is required for the dispersion of the lubricating agent in the same spinning preparation, it is also feasible to use relatively water-insoluble diglycidic ethers and amines.

For the production of tire cord or other filamentary reinforcing materials of polyethylene terephthalate, it is well known that the initial filaments are obtained by spinning or extruding from a melt of the polyester. Before any further processing, i.e., before spooling, stretching, etc., it is generally conventional to conduct the freshly spun filaments over a godet, by means of which a spinning preparation is applied. This operation is necessary in order to smooth or lubricate the thread or yarn consisting of a plurality of individual continuous monofilaments and to bring about a better thread closure, thereby assuring a relatively frictionless passage over the textile machinery required in the succeeding process steps. As spinning preparations there are used, for example, aqueous emulsions of natural fats or oils, such as vegetable oils, glycerides, esters of higher fatty acids, or more generally, the so-called "wool oils."

As natural lubricants, there can be used such substances as palm kernel oil, coconut oil, cottonseed oil or the like. Many synthetic esters are useful as lubricants, including the followng substances by way of example: butylstearate, octylstearate, oleyl ester of oleic acid, trimethylolpropane-caprylic acid esters, 2-methyl-2-propyl-propanediol-1,3-di-laurate and 2-ethyl-2-butyl-propanediol-1,3-di-laurate. Mineral oils are also useful lubricants. These textile lubricants are dispersed in water, preferably by using a non-ionic emulsifying agent, especially including non-ionic surface active organic compounds as the polyethoxylated-higher fatty acids, -higher fatty alcohols, -sorbitol esters or -sorbitans.

Frequently, such spinning preparations also contain compounds which reduce the electrostatic charge of the filamentary material although the lubricants themselves have some anti-static effect. There are benizne spinning preparations which are also known as lubricants, in particular, paraffin oils, i.e., saturated aliphatic hydrocarbons boiling in the gasoline range, containing free fatty acids.

For the present process, all known spinning preparations for polyethylene terephthalate are useful which are aqueous emulsions or which are based on a water-miscible organic solvent such as benzine. Such miscibility can be determined by a simple preliminary test.

The term "spinning preparation" is employed herein with reference to those compositions which are normally used for proper lubrication of the polyethylene terephthalate filaments during textile operations, i.e., during the spinning and weaving or otherwise fabricating individual filaments or staple fibers into various textile articles. In addition to the essential lubricating agent and its solvent or emulsifying liquid such as water and benzine, small amounts of other modifying agents may also be present provided that the resulting composition in combination with the glycidic ether and amine components is substantially neutral, i.e., is substantially free of ionic compounds, without excluding weakly cationic emulsifying agents.

The "non-ionic emulsifying agents" are described in greater detail in such references as Schwartz et al., "Surface Active Agents," Interscience Publ., Inc. (1949), pages 202–217; and the use of these emulsifiers with textile lubricants or "wool oils" is described in Schwartz et al., "Surface Active Agents and Detergents," vol. II, Interscience Publ., Inc. (1958), pages 596–599.

The "weakly cationic emulsifying agents" are likewise described in both volumes of Schwartz et al., and suitable agents for dispersing textile lubricants can be readily selected by one skilled in this art. With respect to oils, fats, and various emulsifying agents, the terms "fatty acids" and "fatty alcohols" are used herein with reference to the higher fatty acids and their corresponding alcohols, i.e., those compounds which have an aliphatic hydrocarbon chain of at least about 8 carbon atoms up to 18 or even more carbon atoms. These substances are usually derived from natural sources and are usually mixtures of varying chain length, but synthetic compounds may also be used.

The simultaneous application of the base coat of the bonding composition and the lubricating agent can be easily carried out in the following manner. The aqueous or benzine spinning preparation is mixed with an aqueous solution or diluent which contains the diglycidic ether of a lower alkane-diol and the heterocyclic or aliphatic amine, and this mixture is applied to the yarn by means of a godet normally used for the application of the spinning preparation. However, it is also possible to arrange two godets, one below the other, and to apply the spinning preparation and the bonding composition in the same or different liquid diluents separately, but in immediate succession. In both cases there is obtained a perfectly uniform application of the two agents, and the coated filaments are then heat treated to cure the bonding agent. The subsequent process steps can then be executed without any trouble, i.e., without thread breaks caused by excessive friction and without losing the improved rubber adhesion.

Since the moistening of the yarn with spinning preparation must be carried out under all circumstances, the process in which the spinning preparation containing a lubricating agent is simultaneously applied with the bonding agent for improvement of rubber adhesion, permits the saving of one process step. This is of course possible only in the case of the diglycidic ether and amine bonding compositions, since these treating agents do not stiffen the thread or cause it to be rough and inflexible. At the same time, it was surprising to discover that these two agents would function equally well even though combined in their application to the filaments.

The invention is further explained by the following examples shown in the table and discussed below in conjunction with the schematic drawing, it being understood that these examples are merely illustrative and not exclusive. Parts and percentages are by weight unless otherwise indicated.

A polyethylene terephthalate yarn 1 (1000 denier/210 individual filaments) emerges from the spinning nozzle S and is conducted over a godet 2 where it is moistened with a spinning preparation containing a bonding agent for the improvement of rubber adhesion (for composition see columns 1 and 2 of the table). The impregnated yarn with this combination of agents is then collected on spool 3. The spool 3 is placed before the stretching apparatus 4. The yarn is unwound or drawn from spool 3 and the stretching takes place at a temperature of about 225° C. Next, the yarn is conducted through a steam zone 5, maintained at 245° C. so as to cause a slight shrinkage of the yarn, and the thread is taken up again on spool 6. This operation completes the "first stage" and the yarn filaments have a base coat of the bonding agent which has been fully cured by the applied temperatures. The oil of the spinning preparation retains its lubricating properties throughout the process.

For the second stage (FIG. 2), two spools 6 are then twisted into a cord yarn of 1000 denier 2X, 500 S/500 Z. The cord yarn of spool 7 is then conducted, in a conventional manner, through a tank 8 in which there is an aqueous dispersion of a partially condensed resorcinol-formaldehyde resin and a vinyl pyridine latex, using a conventional RFL formulation. The fixing or curing of this RFL bonding agent takes place in chamber 9 at 160° C. to 230° C.

TABLE

| Ex. No. | Spinning preparation | 1st Stage—bonding agents | 2nd Stage RFL-impregnation with vinylpyridine latex | | Cord strength (kg.) RFL-impregnation | | Rubber Adhesion [1] (kg.) |
|---|---|---|---|---|---|---|---|
| | | | Temperature (°C.) | Staying time (sec.) | Before | After | |
| 1 | 690 parts water<br>100 parts butyl stearate<br>100 parts emulsifier A [3] | 100 parts 1, 3 BDD [2]<br>10 parts piperazine hydrate (6H$_2$O) | 210 | 40 | 12.6 | 12.3 | 12.0 |
| 2 | 760 parts water<br>50 parts plam kernel oil<br>80 parts emulsifier B [3] | 110 parts 1, 3 BDD<br>10 parts piperazine hydrate | 210 | 40 | 12.6 | 12.2 | 10.8 |
| 3 | 760 parts water<br>50 parts palm kernel oil<br>80 parts emulsifier C [3] | 100 parts 1, 3 BDD<br>10 parts piperazine hydrate | 210 | 40 | 12.5 | 12.2 | 11.2 |
| 4 | 760 parts water<br>50 parts palm kernel oil<br>70 parts emulsifier A [3] | 100 parts 1, 3 BDD<br>10 parts piperazine hydrate | 210 | 40 | 12.5 | 12.4 | 11.8 |
| 5 | 770 parts water<br>50 parts palm kernel oil<br>50 parts emulsifier A [3] | 115 parts 1, 3 BDD<br>15 parts piperazine hydrate | 210 | 40 | 12.7 | 12.5 | 12.4 |

[1] For the determination of the static rubber adhesion, the pretreated cord is vulcanized at 150° C. for 25 minutes into a carcass mixture in such a manner that the adhesion length amounts to precisely 1 cm. The force is measured which must be applied in order to pull the cord out of the rubber piece.
[2] Butanediol diglycidic ether.
[3] Emulsifier A = polyethoxylated sorbitol ester.
Emulsifier B = polyethoxylated oleic acid.
Emulsifier C = polyethoxylated soribtan.

Similar excellent results have been achieved by using each of the following preparations in which all percentages are by weight:

Example No. 6:

3.0% palm kernel oil
8.0% butylstearate
4.5% Atlox 1045 A
1.0% Atlas G 1086
0.2% Emulphor EL
2.9% Araldit DY 022
0.9% piperazine hydrate (6H$_2$O)
79.5% H$_2$O (distilled)

Example No. 7:

12.25% paraffin oil DEA 20/20
4.50% Emulphor A
2.50% Araldit DY 022
0.75% piperazine hydrate (6H$_2$O)
80.00% H$_2$O (distilled)

Example No. 8:

12.25% butylstearate
4.50% Atlox 1045 A
2.50% Araldit DY 022
0.75% piperazine hydrate
80.00% H$_2$O (distilled)

Example No. 9:

6.0% MYRJ 45
3.0% paraffin oil DEA 20/20
2.6% G 4961
1.6% Emulphor EL
3.0% Emulphor A
2.9% Araldit DY 022
0.9% piperazine hydrate (6H$_2$O)
80.0% H$_2$O (distilled)

Example No. 10:

12.25% butylstearate
4.50% Atlox A
2.50% Araldit DY 022
1.50% D7
79.25% H$_2$O (distilled)

The individual components of the compositions described in the foregoing Examples 6–10 are further identified as follows:

(1) Atlox 1045 A = polyethoxylated(30)sorbitol-dioleatedilaurate;
(2) Atlas G 1086 = polyethoxylated(40)-sorbitol-hexaoleate;
(3) Emulphor A = polyethoxylated(8)-oleic acid;
(4) Emulphor EL = polyethoxylated(40)-castor oil;
(5) Atlas G 4961 = polyethoxylated(20)-saturated fatty amine;
(6) MYRJ 45 = polyethoxylated stearate;
(7) Araldit DY 022 = 1,4-butanediol-diglycidic ether;
(8) D7 = code designation for the compound of the formula:

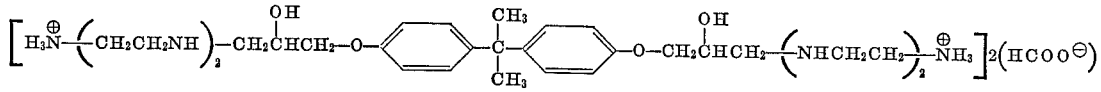

The invention is hereby claimed as follows:

1. An improved process for pretreating a non-woven polyethylene terephthalate yarn for subsequent rubber adhesion, which process comprises: applying substantially concurrently as a base-coating onto said non-woven yarn an aqueous dispersion of:

(A) the curable combination of the diglycidic ether of an aliphatic diol and an amine curing agent, and
    (B) a water-dispersible lubricating agent in an amount sufficient to lubricate the filaments in said non-woven yarn during subsequent transport and handling; and then heating the base coated yarn to an elevated temperature and for a period of time sufficient to fix the ether and amine components thereto.

2. A process as claimed in claim 1 wherein the base coated yarn is heated to a temperature of about 160° C. to 255° C.

3. A process as claimed in claim 1 wherein said ether component is the diglycidic ether of an alkanediol of 2 to 10 carbon atoms.

4. A process as claimed in claim 1 wherein said dispersion contains an emulsifying agent for the uniform dispersion of said lubricating agent in water.

5. A process as claimed in claim 4 wherein said emulsifying agent is a non-ionic surface active organic compound.

6. A process as claimed in claim 1 wherein said ether component is the diglycidic ether of a lower alkanediol of 2 to 4 carbon atoms and said amine component is a compound selected from the class consisting of aliphatic and heterocyclic amines having only carbon, hydrogen and nitrogen atoms, the nitrogen atoms being attached to a hydrocarbon structure of about 2 to 10 carbon atoms.

7. A process as claimed in claim 1 wherein said base-coating is applied to non-woven filaments of polyethylene terephthalate after said filaments are melt-spun and prior to their stretching for fiber orientation, and the base-coated spun filaments are subsequently heated to a temperature of about 160° C. to 255° C.

8. A process as claimed in claim 7 wherein said ether component is the diglycidic ether of a lower alkanediol of 2 to 4 carbon atoms and said amine component is a compound selected from the class consisting of aliphatic and heterocyclic amines having only carbon hydrogen and nitrogen atoms, the nitrogen atoms being attached to a hydrocarbon structure of about 2 to 10 carbon atoms.

9. A process as claimed in claim 8 wherein said dispersion contains an emulsifying agent for the uniform dispersion of at least one of said ether and amine components and said lubricating agent in water.

10. A process as in claim 9 wherein said emulsifying agent is a non-ionic surface active organic compound.

References Cited

UNITED STATES PATENTS

| | | | |
|---|---|---|---|
| 2,469,684 | 5/1949 | Dudley | 260—2 X |
| 2,690,426 | 9/1954 | Jefferson et al. | 117—139.5 X |
| 2,880,116 | 3/1959 | Alps et al. | 117—161 X |
| 2,886,473 | 5/1959 | Schroeder | 117—161 X |
| 2,902,398 | 9/1959 | Schroeder | 117—76 X |
| 2,903,381 | 9/1959 | Schroeder | 117—161 |
| 2,964,470 | 12/1960 | Wentworth | 117—139.5 X |
| 3,039,895 | 6/1962 | Yuk | 117—139.5 X |
| 3,154,429 | 10/1964 | Albrechet et al. | 117—139.5 |
| 3,190,764 | 6/1965 | Cardina | 117—138.8 X |
| 3,222,238 | 12/1965 | Krysiak | 161—184 |
| 3,231,412 | 1/1966 | Pruitt et al. | 117—76 |

FOREIGN PATENTS

| | | |
|---|---|---|
| 780,288 | 7/1957 | Great Britain. |

WILLIAM D. MARTIN, *Primary Examiner.*

M. LUSIGNAN, *Assistant Examiner.*